US011006224B2

(12) United States Patent
Liu et al.

(10) Patent No.: US 11,006,224 B2
(45) Date of Patent: *May 11, 2021

(54) HEARING DEVICE AND A METHOD OF SELECTING AN OPTIMAL TRANSCEIVER CHANNEL IN A WIRELESS NETWORK

(71) Applicant: GN HEARING A/S, Ballerup (DK)

(72) Inventors: Hong Liu, Vaerlose (DK); Brian Dam Pedersen, Ringsted (DK)

(73) Assignee: GN Hearing A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,679

(22) Filed: May 31, 2019

(65) Prior Publication Data
US 2019/0289408 A1 Sep. 19, 2019

Related U.S. Application Data

(63) Continuation of application No. 15/589,563, filed on May 8, 2017, now Pat. No. 10,313,804, which is a (Continued)

(30) Foreign Application Priority Data

Oct. 14, 2010 (DK) .............................. PA201000936
Apr. 6, 2011 (DK) .............................. PA201100263

(51) Int. Cl.
*H04R 25/00* (2006.01)
*H04L 1/00* (2006.01)
(Continued)

(52) U.S. Cl.
CPC ........... *H04R 25/50* (2013.01); *H04L 1/0033* (2013.01); *H04L 43/0823* (2013.01);
(Continued)

(58) Field of Classification Search
CPC .... H04R 25/50; H04R 25/552; H04R 25/554; H04R 2225/51; H04L 43/0823; H04L 1/0033; H04W 72/0453; H04W 72/085
See application file for complete search history.

(56) References Cited

U.S. PATENT DOCUMENTS 4,864,588 A 9/1989 Simpson
5,519,884 A 5/1996 Duque-anton et al.
(Continued)

FOREIGN PATENT DOCUMENTS

EP 1 220 499 A2 7/2002
EP 2 897 384 A2 7/2015
(Continued)

OTHER PUBLICATIONS

Communication pursuant to Article 94(3) EPC dated Sep. 11, 2017 for corresponding/related European Patent Application No. 15181383.9, 9 pages.
(Continued)

*Primary Examiner* — Jae Y Lee
(74) *Attorney, Agent, or Firm* — Vista IP Law Group, LLP

(57) ABSTRACT

A method in a wireless network comprising a plurality of frequency channels and a receiving participant, the method includes: receiving data on a first subset of the plurality of frequency channels, wherein the frequency channels in the first subset are utilized at least once; receiving data on a second subset of the plurality of frequency channels; determining packet error rates for the respective frequency channels in the first and the second subsets; and selecting one of the plurality of frequency channel as an optimal frequency channel based on a result from the act of determining.

22 Claims, 4 Drawing Sheets

Related U.S. Application Data continuation of application No. 13/825,966, filed as application No. PCT/EP2011/067989 on Oct. 14, 2011, now Pat. No. 9,894,447.

(51) Int. Cl.
*H04L 12/26* (2006.01)
*H04W 72/04* (2009.01)
*H04W 72/08* (2009.01)

(52) U.S. Cl.
CPC ......... *H04R 25/552* (2013.01); *H04R 25/554* (2013.01); *H04W 72/0453* (2013.01); *H04W 72/085* (2013.01); *H04R 2225/51* (2013.01)

(56) References Cited

U.S. PATENT DOCUMENTS

| | | | |
|---|---|---|---|
| 6,400,751 B1 | | 6/2002 | Rodgers |
| 6,651,207 B1 | * | 11/2003 | Dicker ................. H04B 1/715 375/132 |
| 9,894,447 B2 | * | 2/2018 | Liu ....................... H04R 25/50 |
| 10,313,804 B2 | * | 6/2019 | Liu ....................... H04L 1/0033 |
| 2002/0191678 A1 | | 12/2002 | Batra et al. |
| 2002/0193072 A1 | | 12/2002 | Alinikula et al. |
| 2003/0081603 A1 | | 5/2003 | Rune |
| 2005/0005227 A1 | | 1/2005 | Felbecker et al. |
| 2005/0089183 A1 | | 4/2005 | Niederdrank et al. |
| 2005/0255843 A1 | | 11/2005 | Hilpisch |
| 2005/0281277 A1 | | 12/2005 | Killian |
| 2006/0041675 A1 | | 2/2006 | Sturrock et al. |
| 2006/0046659 A1 | | 3/2006 | Haartsen et al. |
| 2006/0068842 A1 | | 3/2006 | Sanguino |
| 2006/0133543 A1 | | 6/2006 | Linsky et al. |
| 2006/0227741 A1 | | 10/2006 | Lappetelainen |
| 2006/0274747 A1 | | 12/2006 | Duchscher et al. |
| 2007/0049983 A1 | | 3/2007 | Freeberg |
| 2007/0165754 A1 | | 7/2007 | Kiukkonen et al. |
| 2007/0291797 A1 | | 12/2007 | Rao |
| 2007/0297435 A1 | | 12/2007 | Bucknell et al. |
| 2008/0031478 A1 | | 2/2008 | Alber et al. |
| 2008/0298450 A1 | * | 12/2008 | Zhang ....................... H04L 1/04 375/227 |
| 2009/0111496 A1 | | 4/2009 | Ibrahim |
| 2009/0268807 A1 | * | 10/2009 | Krishnaswamy ..... H04W 72/02 375/240.01 |
| 2010/0054512 A1 | * | 3/2010 | Solum .................... H04R 25/30 381/315 |
| 2010/0158292 A1 | | 6/2010 | Pedersen |
| 2011/0150252 A1 | | 6/2011 | Solum et al. |
| 2012/0058727 A1 | | 3/2012 | Cook et al. |
| 2012/0087505 A1 | | 4/2012 | Popovski et al. |
| 2013/0102251 A1 | | 4/2013 | Linde et al. |
| 2013/0279727 A1 | | 10/2013 | Liu et al. |
| 2014/0341406 A1 | | 11/2014 | Gudiksen |
| 2014/0348327 A1 | | 11/2014 | Linde et al. |
| 2015/0004913 A1 | | 1/2015 | Linde et al. |
| 2015/0098420 A1 | | 4/2015 | Luo et al. |
| 2015/0215214 A1 | | 7/2015 | Ng |
| 2015/0334488 A1 | | 11/2015 | Kim |
| 2015/0364143 A1 | | 12/2015 | Abildgren |
| 2017/0054528 A1 | | 2/2017 | Pedersen et al. |
| 2017/0054763 A1 | | 2/2017 | Pedersen et al. |
| 2017/0055089 A1 | | 2/2017 | Pedersen et al. |

FOREIGN PATENT DOCUMENTS

| | | |
|---|---|---|
| EP | 2 943 026 A1 | 11/2015 |
| GB | 2 344 029 A | 5/2000 |
| JP | 2005-311931 A | 11/2005 |

OTHER PUBLICATIONS

Extended European Search Report dated Feb. 4, 2016 for related/corresponding EP Patent Application No. 15181382.1, 8 pages.
Extended European Search Report dated Jun. 9, 2016 for related/corresponding EP Patent Application No. 15181383.9, 14 pages.
Extended European Search Report dated Mar. 22, 2016 for related/corresponding EP Patent Application No. 15181384.7, 7 pages.
Final Office Action dated Dec. 30, 2016 for related U.S. Appl. No. 13/825,966.
Final Office Action dated Sep. 21, 2015 for related U.S. Appl. No. 13/825,966.
First Technical Examination and Search Report dated Dec. 1, 2015 for related/corresponding Danish Patent Application No. PA 2015 70537, 8 pages.
First Technical Examination and Search Report dated Nov. 18, 2015 for related/corresponding Danish Patent Application No. PA 2015 70536, 7 pages.
First Technical Examination and Search Report dated Nov. 26, 2015 for related/corresponding Danish Patent Application No. PA 2015 70538, 6 pages.
International Search Report and Written Opinion dated Dec. 28, 2011 for PCT Patent Application No. PCT/EP2011/067989.
Japanese Notice of Reasons for Rejection (non-final office acton) dated Apr. 1, 2014 for related JP Patent Application No. 2013-533231, 2 pages.
Luca Stabellini et al., "A new probailistic approach for adaptive frequency hopping" IEEE 20th International Symposium on Personal, Indoor and Mobile Radio Communications, Sep. 13, 2009, 6 pages.
Naresh Gupta, Inside Bluetooth Low Energy, Bluetooth Lower Layers, Jan. 1, 2013, Artech House, Boston-London, pp. 33-44.
Non-final Office Action dated Dec. 7, 2016 for related U.S. Appl. No. 14/835,562.
Non-final Office Action dated Feb. 1, 2017 for related U.S. Appl. No. 14/835,584.
Non-final Office Action dated Feb. 9, 2015 for related U.S. Appl. No. 13/825,966.
Non-final Office Action dated Jun. 8, 2016 for related U.S. Appl. No. 13/825,966.
Non-final Office Action dated May 22, 2017 for related U.S. Appl. No. 14/835,527.
Non-final Office Action dated Oct. 27, 2016 for related U.S. Appl. No. 14/835,527.
Notice of Allowance and Fee(s) due dated Jul. 13, 2017 for related U.S. Appl. No. 14/835,584.
Notice of Allowance and Fee(s) due dated Jul. 27, 2017, for related U.S. Appl. No. 14/835,562.
Notice of Allowance and Fee(s) due dated Jun. 14, 2017 for related U.S. Appl. No. 13/825,966.
Notice of Allowance and Fee(s) due dated Oct. 17, 2017 for related U.S. Appl. No. 13/825,966.
Notice of Allowance and Fee(s) due dated Feb. 7, 2018 for related U.S. Appl. No. 14/835,527.
Non-final Office Action dated Mar. 30, 2018 for related U.S. Appl. No. 15/589,563.
Non-final Office Action dated Jun. 27, 2018 for related U.S. Appl. No. 15/478,170.
Final Office Action dated Aug. 2, 2018 for related U.S. Appl. No. 15/589,563.
Advisory Action dated Oct. 17, 2018 for related U.S. Appl. No. 15/583,563.
Notice of Allowance dated Jan. 9, 2019 for related U.S. Appl. No. 15/589,563.
Non-Final Office Action dated May 20, 2020 for related U.S. Appl. No. 16/656,514.
Final Office Action dated Dec. 31, 2020 for related U.S. Appl. No. 16/656,514.

\* cited by examiner

| Data slot | 0 | 1 | 2 | 3 | 4 | 5 | 6 | 7 | 8 | ... | 60 | 61 |
|---|---|---|---|---|---|---|---|---|---|---|---|---|
| Freq. Channel | 1 | B | 2 | B | 3 | B | 4 | B | 5 | ... | 31 | B |
| Frequency (GHz) | 2.400 | x | 2.422 | x | 2.444 | x | 2.412 | x | 2.434 | ... | 2.484 | x |

FIG. 2

HEARING DEVICE AND A METHOD OF SELECTING AN OPTIMAL TRANSCEIVER CHANNEL IN A WIRELESS NETWORK

RELATED APPLICATION DATA

This application is a continuation of U.S. patent application Ser. No. 15/589,563, filed on May 8, 2017, now U.S. Pat. No. 10,313,804, which is a continuation of U.S. patent application Ser. No. 13/825,966, filed Jul. 11, 2013, now U.S. Pat. No. 9,894,447, which is the national stage of PCT Application No. PCT/EP2011/067989, which claims priority to and the benefit of Danish Patent Application No. PA 2010 00936, filed on Oct. 14, 2010, and Danish Patent Application No. PA 2011 00263, filed on Apr. 6, 2011. The disclosures of all of the above application are expressly incorporated by reference in their entireties herein.

FIELD

The present specification relates to a hearing device adapted to select an optimal transceiver channel in a wireless network. Additionally, the present specification relates to a corresponding method.

BACKGROUND

In a wireless binaural hearing device system, it may be advantageous to transfer data between the two hearing device via an optimal frequency channel, wherein the optimal frequency channel adapts to variations in the environment of the wireless binaural hearing device system.

Therefore, an object of one or more embodiments described herein is to select an optimal frequency channel for transmission of data between hearing devices in a binaural hearing device system.

SUMMARY

The above and other objects are achieved by a method of receiving data on an optimal frequency channel in a wireless network comprising a plurality of frequency channels and a receiving participant, the method comprising receiving data on a first subset of the plurality of frequency channels, wherein each of the plurality of frequency channels is utilized at least once; receiving data on a second subset of the plurality of frequency channels, wherein the optimal frequency channel is utilized; determining a packet error rate for each of the plurality of frequency channels in the first and the second subsets; and optionally determining a frequency channel to be the optimal frequency channel based on the packet error rate.

It is an advantage of the method that data is transmitted on a first optimal frequency channel in the second subset while all the frequency channels are scanned in the first subset to monitor whether a change in optimal frequency channel has occurred i.e. whether another frequency channel than the first optimal frequency channel has become the optimal frequency channel. Thus, determination of which frequency channel is the optimal frequency channel is performed simultaneously with transmission on the optimal channel. An additional advantage of the method is that using many frequency channels gives good frequency diversity to cover larger variation of the wireless channels (the plurality of channels).

In the method, determining a frequency channel to be the optimal frequency channel may further comprise calculating a long term evaluation of each of the frequency channels based on the packet error rate of the respective frequency channels and a first time constant; and determining a frequency channel to be the optimal frequency channel based on the long term evaluation.

A frequency channel which has been the optimal frequency channel over a long period of time e.g. 30 seconds may prove to be a better (more stable) choice for optimal frequency channel than a frequency channel which has only been the optimal frequency channel for a short period of time e.g. 1 second.

The method may further comprise calculating a short term evaluation of each of the frequency channels based on the packet error rate of the respective frequency channels and a second time constant being smaller than the first time constant; and determining a frequency channel to be the optimal frequency channel based on the short term evaluation, e.g. if a plurality of frequency channels comprise an identical optimal long term evaluation.

Thus, if a plurality of frequency channel have the same optimal characteristics on a long time scale (30 seconds above), then the optimal channel of this plurality of channels is the one having also optimal short term characteristic i.e. the frequency channel being the optimal most recently of the channels having long term optimal characteristics is chosen.

The method may further comprise determining a frequency channel to be the optimal frequency channel based on a random selection from frequency channels having identical optimal short term and optimal long term evaluations.

The method may further comprise determining an environment of the receiving participant based on the long term evaluation of the frequency channels and/or the short term evaluation of the frequency channels.

The method may further comprise maintaining the optimal frequency channel as the optimal frequency channel if the packet error rate of the optimal channel is below a first threshold value or if the packet error rates of the frequency channels in the second subset is above a second threshold value.

The method may further comprise transmitting an optimal frequency channel and a countdown value from the receiving participant to a transmitting participant, wherein said countdown value indicates to the receiving and transmitting participants when to switch to the optimal frequency channel.

Thereby it may advantageously be ensured that the receiving and transmitting participants switch to the same optimal frequency channel at the same time.

The method may further comprise transmitting high bandwidth data between the receiving participant and a transmitting participant in the second subset of the plurality of frequency channels. The high bandwidth data may be adapted to carry a real-time audio signal.

Thereby it may advantageously be ensured that audio data is transmitted on the optimal frequency channel i.e. maximizing the probability that the audio data will reach the receiving participant from the transmitting participant.

The method may further comprise transmitting redundant data between the receiving participant and a transmitting participant in the first subset of the plurality of frequency channels.

It is an advantage that if redundant data is used from scanning the plurality of frequency channels, then it is acceptable if some of the data does not reach the receiving participant from the transmitting participant.

The method may further comprise excluding a frequency channel from the first and second subsets if the packet error rate of the frequency channel is above a third threshold value.

Thereby is advantageously obtained that if a frequency channel is permanently in disorder, then there is no reason in utilizing it and it may be replaced by another frequency channel thereby optimizing throughput between the transmitting and receiving participant and/or providing better statistical data on which the optimal frequency channel has to be chosen.

The receiving participant may be a hearing device.

Also disclosed is a method of selecting an optimal frequency channel in a wireless network comprising a plurality of frequency channels and a transmitting participant and a receiving participant, the method comprising utilizing redundant data to determine which of the plurality of frequency channels is the frequency channel with the lowest packet error rate.

Also disclosed herein is a hearing device comprising a transceiver and a digital signal processor adapted to perform the method as disclosed herein.

The hearing device and embodiments thereof has the same advantages as the method of receiving data on an optimal frequency channel in a wireless network.

A method in a wireless network comprising a plurality of frequency channels and a receiving participant, the method includes: receiving data on a first subset of the plurality of frequency channels, wherein the frequency channels in the first subset are utilized at least once; receiving data on a second subset of the plurality of frequency channels; determining packet error rates for the respective frequency channels in the first and the second subsets; and selecting one of the plurality of frequency channel as an optimal frequency channel based on a result from the act of determining.

Optionally, the method further includes determining long term evaluations of the respective frequency channels in the first and second subsets based on the packet error rates for the respective frequency channels in the first and the second subsets, and a first time constant; wherein the one of the plurality of frequency channels is selected as the optimal frequency channel based on the long term evaluations.

Optionally, the method further includes determining long term evaluations of the respective frequency channels in the first and second subsets based on the packet error rates for the respective frequency channels in the first and the second subsets, and a first time constant; and determining short term evaluations of the respective frequency channels in the first and second subsets based on the packet error rates for the respective frequency channels in the first and second subsets, and a second time constant, the second time constant being smaller than the first time constant; wherein the one of the plurality of frequency channels is selected as the optimal frequency channel based on the short term evaluations if the long term evaluations of two or more of the frequency channels have a same evaluation value.

Optionally, the method further includes determining long term evaluations of the respective frequency channels in the first and second subsets based on the packet error rates for the respective frequency channels in the first and the second subsets, and a first time constant; and determining short term evaluations of the respective frequency channels in the first and second subsets based on the packet error rates for the respective frequency channels in the first and second subsets, and a second time constant, the second time constant being smaller than the first time constant; wherein the one of the plurality of frequency channels is selected as the optimal frequency channel based on a random selection from two or more of the frequency channels having the respective short term evaluations that are identical, and the respective long term evaluations that are identical.

Optionally, the method further includes determining an environment of the receiving participant based on long term evaluations of some of the plurality of frequency channels, short term evaluations of some of the plurality of frequency channels, or both.

Optionally, the method further includes maintaining the selected one of the plurality of frequency channels as the optimal frequency channel if the packet error rate of the selected one of the plurality of frequency channels is below a first threshold value or if the packet error rates of the frequency channels in the second subset are above a second threshold value.

Optionally, the method further includes transmitting a countdown value from the receiving participant to a transmitting participant, wherein the countdown value indicates to the receiving and transmitting participants when to switch to the optimal frequency channel.

Optionally, the method further includes transmitting high bandwidth data between the receiving participant and a transmitting participant in the second subset of the plurality of frequency channels.

Optionally, the high bandwidth data is configured to carry a real-time audio signal.

Optionally, the method further includes transmitting redundant data between the receiving participant and a transmitting participant in the first subset of the plurality of frequency channels.

Optionally, the method further includes excluding a certain one of the frequency channels in the first and second subsets as a possible candidate for the optimal frequency channel if the packet error rate for the certain one of the frequency channels is above a threshold value.

Optionally, the receiving participant is a hearing device.

Optionally, two adjacent ones of the plurality of frequency channels have a frequency distance therebetween.

A hearing device includes a transceiver and a digital signal processor configured to perform any of the above methods.

A method of selecting an optimal frequency channel in a wireless network comprising a plurality of frequency channels and a transmitting participant and a receiving participant, the method includes: utilizing redundant data to determine which of the plurality of frequency channels is a frequency channel with a lowest packet error rate.

Optionally, two adjacent ones of the plurality of frequency channels have a frequency distance therebetween.

A hearing device includes a transceiver and a digital signal processor configured to perform the above method.

A method of transmitting data between a first communication device and a second communication device over a bi-directional wireless communication channel, where at least one of the first and second communication devices comprises a hearing instrument, the method includes: providing, by the first communication device, a first plurality of data; transmitting the first plurality of data from the first communication device to the second communication device through a plurality of frequency channels across a radio frequency range of the bi-directional wireless communication channel; determining metric values representing respective qualities for the respective frequency channels; determining a favored frequency channel based on the metric values; and transmitting, from the first communication device to the second communication device, a second plurality of data on the favored frequency channel.

Optionally, the favored frequency channel is determined using redundant data.

Optionally, the first communication device comprises the hearing instrument.

Optionally, the second communication device comprises an additional hearing instrument.

Optionally, the hearing instrument comprises a first hearing aid.

Optionally, the second communication device comprises a second hearing aid.

Optionally, the method further includes determining long term evaluations of the respective frequency channels; wherein the favored frequency channel is determined based on the long term evaluations.

Optionally, the method further includes determining short term evaluations of the respective frequency channels; wherein the favored frequency channel is determined based on the short term evaluations.

Optionally, the method further includes determining an environment of the second communication device based on long term evaluations of some of the plurality of frequency channels, short term evaluations of some of the plurality of frequency channels, or both.

Optionally, the second plurality of data comprises a real-time audio signal.

Optionally, two adjacent ones of the frequency channels have a frequency distance therebetween.

A hearing device includes a transceiver and a digital signal processor configured to perform any of the methods described herein.

A wireless hearing system configured to exchange data over a bi-directional wireless communication channel, the hearing system includes: a first hearing instrument comprising a first radio transceiver; and a second hearing instrument comprising a second radio transceiver; wherein the first hearing instrument is configured for: providing a first plurality of data, transmitting the first plurality of data for reception by the second hearing instrument through a plurality of frequency channels across a radio frequency range of the bi-directional wireless communication channel, determining metric values representing respective qualities for the respective frequency channels, determining a favored frequency channel based on the metric values, and transmitting, from the first communication device to the second communication device, a second plurality of data on the favored frequency channel.

Optionally, the first hearing instrument is configured to determine the favored frequency channel using redundant data.

Optionally, the first hearing instrument comprises a first hearing aid.

Optionally, the second hearing instrument comprises a second hearing aid.

Optionally, the wireless hearing system comprises a wireless binaural hearing aid system.

Optionally, two adjacent ones of the frequency channels have a frequency distance therebetween.

Further advantages and further embodiments are disclosed below.

BRIEF DESCRIPTION OF THE DRAWINGS

The drawings illustrate the design and utility of various features described herein, in which similar elements are referred to by common reference numerals. These drawings are not necessarily drawn to scale. In order to better appreciate how the above-recited and other advantages and objects are obtained, a more particular description will be rendered, which are illustrated in the accompanying drawings. These drawings depict only exemplary features and are not therefore to be considered limiting in the scope of the claims.

FIG. 2 shows an embodiment of a frame, frequency channels and frequencies utilized for the frequency channels.

DETAILED DESCRIPTION

Figure 1:
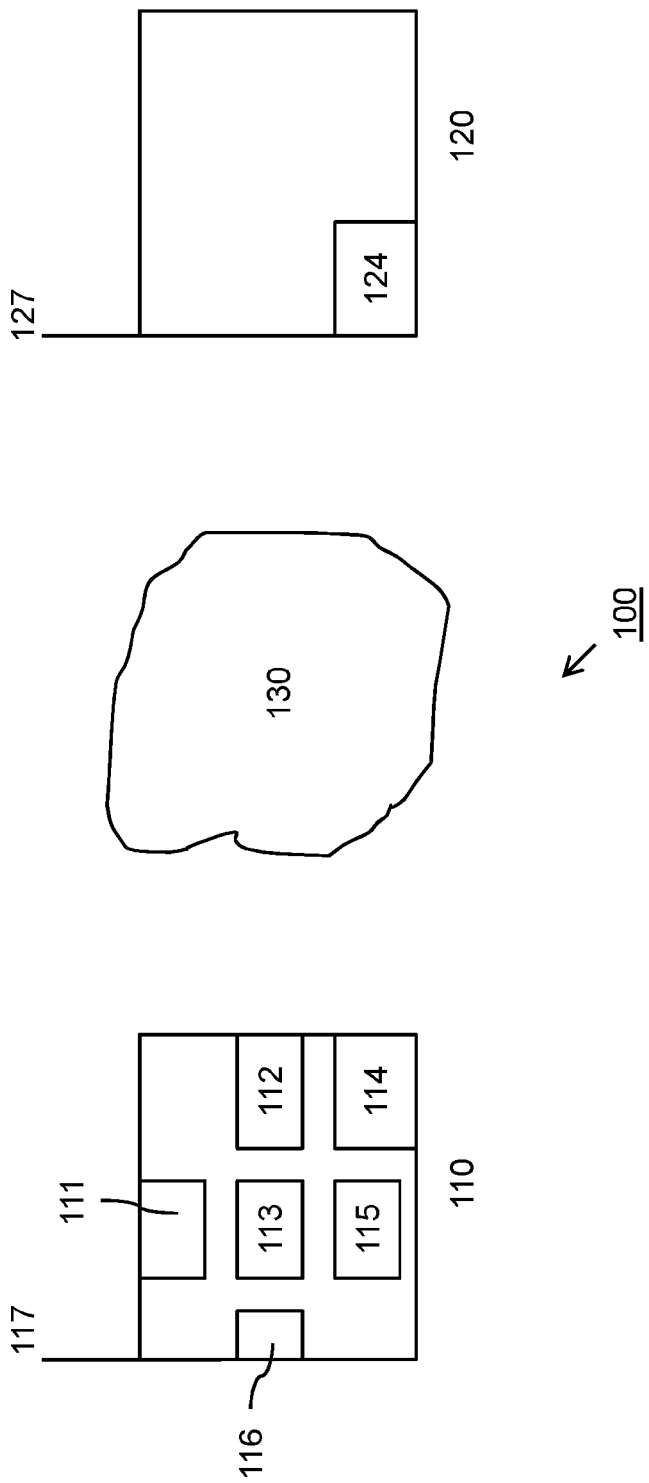
FIG. 1 shows an embodiment of a hearing device system comprising a first hearing device and a second device.

Various features are described hereinafter with reference to the figures. It should be noted that the figures are not necessarily drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated feature needs not have all the aspects or advantages shown. An aspect or an advantage described in conjunction with a particular feature is not necessarily limited to that feature and can be practiced in any other features even if not so illustrated, or if not so explicitly described.

In the above and below, a hearing device may be selected from the group consisting of a hearing aid, a hearing prosthesis, and the like. Examples of a hearing device may include a behind the ear (BTE) hearing aid and a in the ear (ITE) hearing aid.

Below and above, a best and/or optimal frequency channel is to be understood as a frequency channel among a plurality of frequency channels in which optimal frequency channel packet error rate is the lowest of the plurality of frequency channels.

FIG. 1 shows an embodiment of a hearing device system 100 comprising a first 110 hearing device and a second 120 device.

In one or more embodiments, the second 120 device may be selected from the group consisting of a second hearing device, a mobile telephone, a cordless telephone, a television, a fitting instrument fitting the first hearing device 110 to a user's hearing disability, and an intermediate device.

In one or more embodiments, the intermediate device may be a device communicating with the first hearing device 110 using a first communication protocol and with a third device (not shown) using another communication protocol. For example, the intermediate device may communicate with the first hearing device 110 using a frequency band in the ISM frequency band and a Bluetooth-like protocol with low power requirements, and a Bluetooth protocol without low power requirements between the intermediate device and the third device. For example, the first hearing device 110 may be a hearing aid, and the third device may be a Bluetooth enabled mobile telephone, and the intermediate device may provide communication between the hearing aid and the mobile telephone using the low power communication protocol to communicate with the hearing aid and a Bluetooth protocol to communicate with the mobile telephone.

The first 110 hearing device and the second device 120 may be communicatively coupled via a wireless network 130 as disclosed below.

The first hearing device 110 comprises one or more microphones 111 and at least one receiver 112. Additionally, the first hearing device 110 comprises a processing unit 113 such as a digital signal processor (DSP). The DSP 113 is communicatively coupled to the microphone 111 and the receiver 112. The communicative coupling may be embodied via electrical wires, a printed circuit board (PCB) or the like.

The microphone 111 may receive an audio signal which is converted into a digital signal by an analog to digital converter (ADC). The digital signal is transmitted from the ADC to the DSP 113, thereby enabling the DSP to modify the digital signal to accommodate a hearing deficiency of a user of the hearing device 110.

The modified digital signal may be transmitted from the DSP 113 to the receiver 112, which may convert the modified digital signal into a modified audio signal. The modified audio signal may be transmitted towards the tympanic membrane of the user.

The hearing device 110 may comprise a memory device 115 such as a volatile or non-volatile memory device. Additionally, the hearing device 110 may comprise a detector 116 further described below. The detector 116 may be communicatively coupled to the memory device 115 via the PCB.

The hearing device 110 and/or the second device 120 comprise respective communication units 114, 124 such as transceivers i.e. a combined transmitter and receiver. In one or more embodiments, the hearing device 110 may comprise a transmitter 114 and the second 120 device a receiver 124 or vice versa. In one or more embodiments, the hearing device 110 may comprise a transceiver 114 and the second 120 device a receiver 124 or vice versa.

The respective communication units 114, 124 may be communicatively coupled to respective antennas, 117, 127 e.g. via the PCB.

The hearing device 110 and the second device 120 may communicate via the respective communication units 114, 124 in order to establish the wireless network 130.

In one or more embodiments, the hearing device 110 and the second device 120 may communicate via the wireless network 130 using a number of frequency channels. In one or more embodiments, the number of frequency channels may be 31 frequency channels. In one or more embodiments, the number of frequency channels may be selected from the ISM (Industrial, Scientific and Medical) radio bands.

In one or more embodiments, one of the devices 110, 120 may act as a master and the other of the devices 110, 120 may act as a slave.

FIG. 2 shows an embodiment in which the number of frequency channels (here 31 frequency channels) are selected from the frequency band ranging from 2.402 GHz to 2.480 GHz. However, other frequency bands may be used, e.g. other frequency bands in the ISM frequency band such as for example 902 MHz-928 MHz. In one or more embodiments, frequency bands outside the ISM frequency bands may be utilized.

In one or more embodiments, the frequency channels 1 to 31 may be selected randomly from the ISM frequency band e.g. from the 2.404 GHz-2.478 GHz frequency band. The frequency distance between two adjacent frequency channels is approximately 22 MHz in order to avoid interference from WLAN.

In one or more embodiments, data transmitted between the hearing device 110 and the second device 120 may be transmitted in slots. A slot may be 1.5 ms wide, and a slot may contain a frequency channel i.e. in a given slot one frequency channel may be utilized. In one or more embodiments, data may be transmitted in a frame comprising 62 slots (slot 0 to slot 61).

The device (e.g. the second device 120) transmitting data to the other device (e.g. the first hearing device 110) may be referred to as the transmitting participant, and the other device may be referred to as the receiving participant.

FIG. 2 additionally shows an embodiment of a frame in which the 62 slots and 31 frequency channels are correlated. In a first subset (e.g. a first number) of slots i.e. every second slot, data is transmitted on a best frequency channel, which best frequency channel will be described in further details below.

In a second subset (e.g. a second number) of slots i.e. the remaining slots (every other second slot), data is transmitted on one of the 31 frequency channels in such a way that all the 31 frequency channels are utilized at least once for every 62 slots i.e. the best frequency channel is utilized 32 times (in each of the first subset of slots=every other slot=31 slots and once in the second subset of slots=1 slot), and the other 30 frequency channels are utilized once each (once in the second subset of slots).

In one or more embodiments, the best frequency channel may be changes during a frame i.e. a frame may start out with a first frequency channel being the best frequency channel and later in the frame, the best frequency channel may be another frequency channel.

In one or more embodiments, in the second subset of slots, the frequency channels may be chosen sequentially e.g. by turn. In an alternative embodiment, the frequency channels in the second subset of slots may be chosen randomly with the premise that a chosen frequency channel cannot be chosen again for the current second subset of slots.

In FIG. 2, B represent the best frequency channel, and X represents the frequency at which the best frequency channel B operates e.g. in the range 2.404 GHz-2.480 GHz (but it could be in any range in the ISM frequency band). In the case where the optimal frequency channel is changed during a frame, X may have different values during that frame.

In one or more embodiments, the hearing device 110 comprises a detector 116 detecting the data throughput for each frequency channel in the second subset of slots of a frame. Thereby, the hearing device 110 is able to detect which of the 31 frequency channels is the best.

In one or more embodiments, the detector monitors all 62 data slots in the frame, and collects the packet error rate for the first subset of slots and the second subset of slots separately. For the second subset the packet error rates are collected for each frequency channels i.e. 31 values. For the first subset the packet error rate has only one value i.e. best channel packet error rate. All the packet error rates are collected and stored with a time stamp in the memory 115 in order to enable the DSP to perform both long term (e.g. approximately thirty seconds) and short term evaluations (e.g. approximately 2 seconds) on the packet error rates. Thus, for each frequency channel, the DSP calculates a short term evaluation of the packet error rate e.g. a running average over 2 seconds for each frequency channel and a long term evaluation of the packet error rate e.g. a running average over thirty seconds for each frequency channel. The short term and long term evaluations are updated substantially continuously i.e. each time a slot has been completed. The DSP stores the short term and long term evaluations for each frequency channel in the memory.

In one or more embodiments, thresholds may be introduced. If the packet error rate of the best channel (the first subset of frequency channels) is lower than a first threshold, or if the packet error rates of the monitor channels (i.e. the frequency channels in the second subset of frequency channels) are larger than a second threshold, then the best channel is maintained as the best frequency channel.

Otherwise, the detector 116 selects another best channel from based on a frequency channel in the second subset having the lowest packet error rate in the long term evaluation.

In one or more embodiments, if a plurality of frequency channels has the same lowest packet error rate in the long term evaluation, then the best frequency channel is selected by the DSP as the one frequency channel having the lowest packet error rate in the short term evaluation. If a plurality of frequency channels additionally has the same lowest packet error in the short term evaluation, then the DSP will select one frequency channel randomly from the plurality of frequency channels having the same lowest long term evaluation packet error rate and the same lowest short term evaluation packet error rate.

Figure 3:
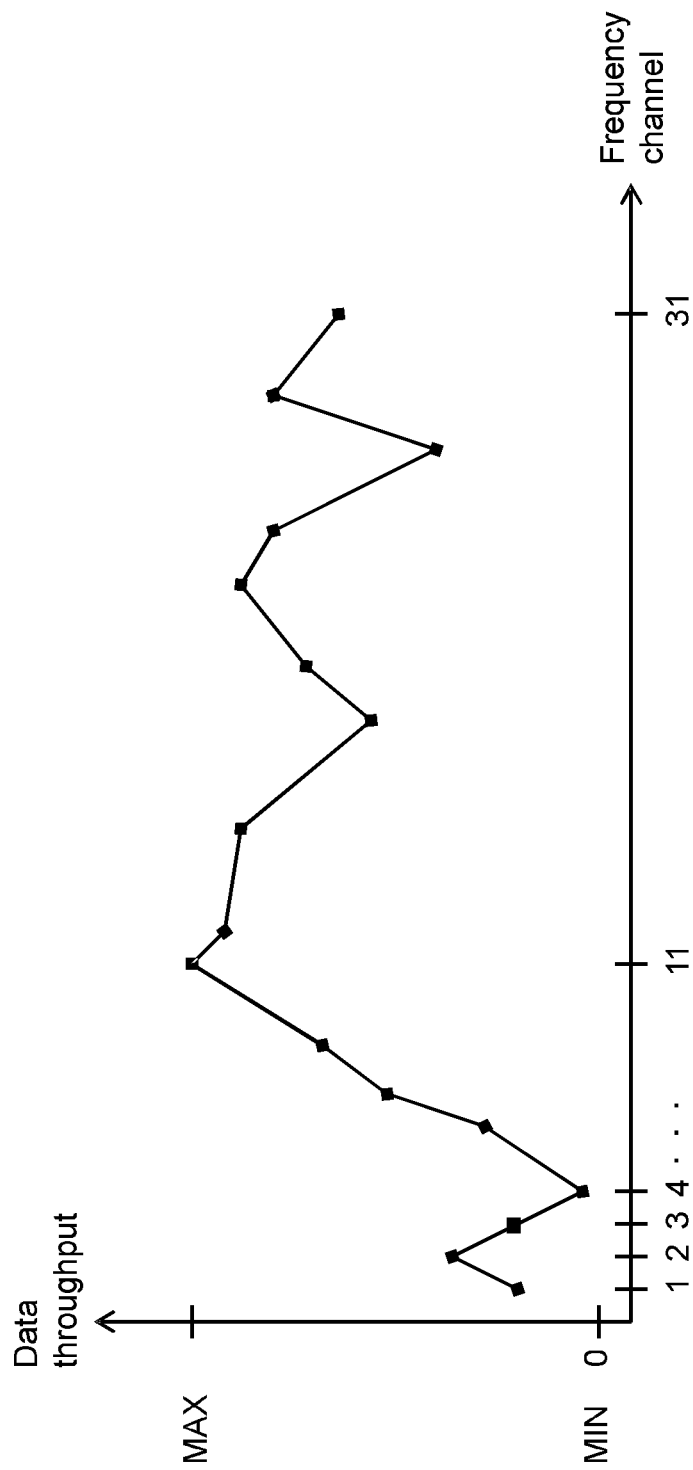
FIG. 3 shows an example of a distribution of frequency channel throughput of the frequency channels in a wireless network.

FIG. 3 shows an example of a distribution of frequency channel throughput in which the abscissa comprises the 31 frequency channels (channel 1 to 31) and the ordinate comprises the data throughput (determined by the detector 116) ranging from a minimum (0) to a maximum (10 data units through).

In one or more embodiments, the detector may be a program being executed in the DSP 113 i.e. a software program being executed by the DSP 113 to provide the functionality of the detector described above. Thereby, the detector 116 may be contained in the DSP 113.

The detector 116 stores a time stamp with each frequency channel number and the corresponding packet throughput for the frequency channel at the given time in a first part of the memory device 115 of the hearing device 110. In a second and a third part of the memory device 115, the detector 116 stores a running average of each frequency channel number. The running average in the second part may for each frequency channel contain the long term evaluation i.e. this running average is for each frequency channel calculated as $$\sum_{i=1}^{n} \frac{X_i}{i},$$

where $X_i$ represents the channel throughput (e.g. 1/{packet error rate}) at time i, where i represents the time stamp of the packet throughput for a frequency channel recorded during the last thirty seconds. The running average in the third part may for each frequency channel contain the short term evaluation i.e. this running average is for each frequency channel calculated as $$\sum_{i=1}^{n} \frac{X_i}{i},$$

where $X_i$ represents the channel throughput (e.g. 1/{packet error rate}) at time i, where i represents the time stamp of the packet throughput for a frequency channel recorded during the last 2 seconds.

In one or more embodiments, the receiving participant may determine the best channel as described above. Subsequently, the receiving participant needs to inform the transmitting participant about the best channel on which the transmitting participant should transmit. This may be achieved by including information about the best channel into a header of a packet sent from the receiving participant to the transmitting participant. In an additional embodiment, the header may further include a countdown value such as a number indicating in how may slots, the change to the best frequency should occur.

In an example, the receiving participant may in a first slot transmit, on a frequency channel X (e.g. channel 2 of slot 2 in FIG. 2), in the header of a packet that the best frequency channel is frequency channel number Y (e.g. channel 24) and that the transmitting participant should switch to this best frequency channel in 10 slots. In the next slot (e.g. slot 3), the receiving participant may in this slot transmit, on a frequency channel XX (where XX is the frequency channel of the next slot in the frame, e.g. frequency channel B of slot 3), in the header of a packet the best frequency channel is frequency channel number Y and that the transmitting participant should switch to this best frequency channel in 9 slots. In the next slot (e.g. slot 4), the receiving participant may in the second slot transmit, on a frequency channel XXX (where XXX is the frequency channel of the next slot in the frame, e.g. frequency channel 3 of slot 4), in the header of a packet the best frequency channel is frequency channel number Y and that the transmitting participant should switch to this best frequency channel in 8 slots, and so on until the countdown value reaches zero (in slot 12 in this example). In the slot following the slot in which the countdown value reaches zero (slot 13 in this example), the transmitting participant and the receiving participant both switch to transmit and receive, respectively, on the best frequency channel (frequency channel Y in the example). In the above example with a countdown value of 10, the switch to the best channel Y occurs in the 11. frame after the receiving participants transmits the first slot indicating the best channel Y.

In one or more embodiments, the hearing device 110 may utilize the best channel, i.e. the first subset of slots discussed above, to transmit and/or receive audio data from the second device 120. Additionally, the second subset of slots (i.e. wherein all the 31 frequency channels are utilized) may be used to transmit and/or receive audio and/or less important data such as program number (e.g. of the hearing device 110), volume information of the transmitting participant, environmental information, and the like, to the receiving participant.

In an example, the second device 120 may be another hearing device, and thus audio data may be transmitted between the two hearing aids (110, 120) using the best channel. Further, audio and/or less important data being transmitted a plurality of times, such as environmental information, program number, etc., may be transmitted using the frequency channels from the second subset (e.g. all the 31 channels in a 31 frequency channel system).

Thus, redundant data (i.e. less important data comprising little information and being transmitted a plurality of times, such as environmental information, program number, etc.) may be utilized to determine which of the frequency channels (in the second subset of frequency channels) is the best channel. An effect of this is that the audio signal being transmitted on the best channels and which audio signal is important for a user is certain (or very close to certain) to be delivered from the transmitting participant to the receiving participant. Likewise, less important data such as program number may be lost in some of the channels from the second subset, i.e. if one or more of these frequency channels are faulty, however due to redundancy in the less important data the information will reach the receiving participant e.g. when the best channel is used in the second subset of frequency channels. Further, whether the less important data is reaching the receiving participant at the beginning or end or middle of the frame is not important because it only means a slip of e.g. 1 ms in e.g. change of program number in the receiving participant.

In one or more embodiments, the hearing device 110 is adapted to exclude one or more frequency channels from the 31 frequency channels utilized in the second number of slots. For example, one or more frequency channels may provide a low throughput due to the head shape of a user utilizing the hearing device 110. A user may for example have a head shape resulting in channel 4 (see FIG. 3) constantly providing a low data throughput. Thereby, the hearing device 110 may be adapted to exclude this frequency channel from the frequency channels utilized in the second number of slots. Instead, the now empty slot may in one or more embodiments be utilized for another of the remaining 30 frequency channels or it may be utilized for transmitting audio or data over the best frequency channel.

Figure 4:
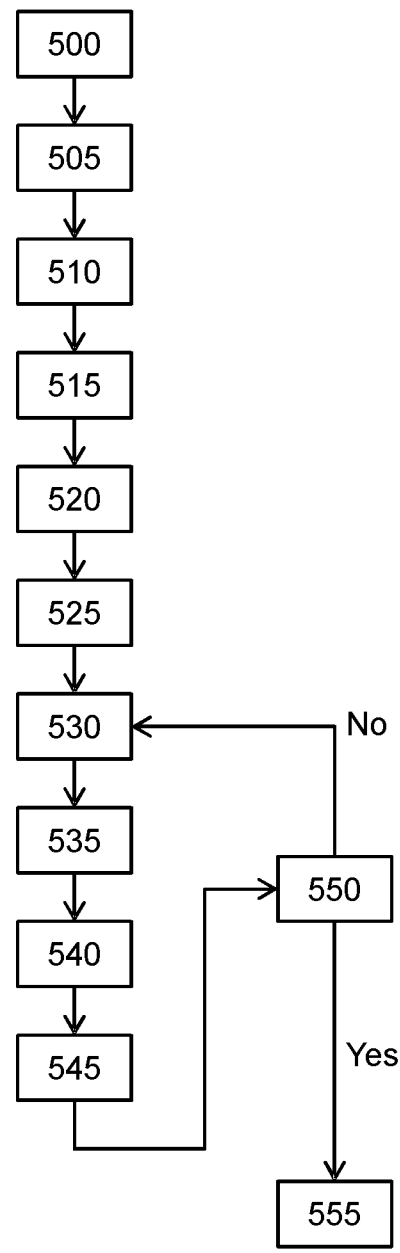
FIG. 4 shows an embodiment of a method of selecting an optimal transceiver channel in a wireless network.

FIG. 4 shows an embodiment of a method of selecting an optimal transceiver channel.

The method starts in step 500.

In step 505, the hearing device 110 (in this embodiment the receiving participant) resets or deletes the first and second and third parts of the memory device.

In step 510, communication between the hearing device 110 and the second device 120 (in this embodiment the transmitting participant) via the wireless network 130. Because no frequency channel has been detected as being the best frequency channel, data is transmitted on the 31 frequency channels in a first frame (the first 62 slots of data transmitted and/or received) in such a way that all the 31 frequency channels are utilized at least twice for the first frame. The frequency channels may be chosen sequentially e.g. by turn in the first frame. Alternatively, the frequency channels may be selected such that slot 0 and 1 comprises frequency channel 1, slot 2 and 3 contains frequency channel 2, etc., and slot 60 and 61 contains frequency channel 31.

In step 515, the detector 116 analyses the two times 31 frequency channels of the first frame to calculate the best channel of the first frame based on an average of the packet error rate in the two measurements obtained on each frequency channel.

In step 520, the detector stores the packet error rates of the frequency channels of the first frame together with a timestamp as disclosed above in a first part of the memory device 115.

In step 525, the detector 116 transmits via the communication unit 114, 124 and the antenna 117, 127 from the receiving participant to the transmitting participant the best channel frequency and a countdown value indicating when to switch to the best channel.

In step 530, when the countdown value reaches zero, the receiving participant and the transmitting participant switches to the best channel in the next slot.

In step 535, the detector stores the packet error rates of the frequency channels together with a timestamp as disclosed above in a first part of the memory device 115.

In step 540, the detector 116 analyses the long term evaluation and possibly the short term evaluation as described above of the frequency channels to determine the best channel.

In step 545, the detector 116 provides the resulting best channel and a countdown value to the receiving and transmitting participants if the analysis in step 540 indicates a change in best frequency channel.

In step 550, the method returns to step 530 until the transmission and reception of data between the receiving participant and the transmitting participant via the wireless network 130 has ended.

In step 555, the method ends.

As an alternative to step 510, the hearing device 110 selects a frequency channel as the (initial) best frequency channel. The frequency channel may be selected randomly from the 31 frequency channels.

In an aspect, the method and device are adapted to select a plurality of optimal transceiver channels.

In one or more embodiments, the packet error rate may be embodied as RSSI, bit error rate, packet loss, and/or quality/strength of the frequency channel.

In one or more embodiments, the short term and long term evaluations may be associated with fading and interference of a frequency channel. In one or more embodiments, the short term evaluation may be associated with short term fading and interference of a frequency channel and the long term evaluation may be associated with long term fading and interference of the frequency channel. In an additional or alternative embodiment, the short term and long term evaluations may be associated with changes in environment. In one or more embodiments, the short term and long term evaluations may be used to determine a type of environment in which a wearer of the hearing device according to an embodiment is. Examples of environments with different short term and/or long term evaluations may be an office environment, urban environment, suburban environment, class-room environment, etc. Such environment may provide changes to the long term evaluation i.e. the long term fading and interference (and possibly also in the short term fading and interference). Examples of environments with different short term evaluations may be a user wearing a hearing device according to the above or below turning his/hers head. Such a change i.e. from one head position to another, may lead to a change in short term evaluation e.g. short term fading and interference.

In one or more embodiments, the hearing device may be adapted to determine the environment in which the user of the hearing device is, based on the short term and/or long term evaluation. The hearing device may contain a table correlating certain values of the short term evaluation and/or the long term evaluation with certain types of environments.

In one or more embodiments, the below-mentioned high bandwidth data may be defined as data such as video and/or audio data which must be transmitted and received in an acceptable quality. For example, an audio signal transmitted from a first hearing device to another hearing device must be of such a quality, that the user can recognize the audio signal in both hearing devices. Alternatively or additionally, the high bandwidth data may be embodied as data which must arrive from the transmitting participant to the receiving participant. In one or more embodiments, low bandwidth data may be defined as data which may be transmitted with a certain time-lag such as program selection synchronization between two hearing devices or the like.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

The invention claimed is:

1. A method of receiving data in a wireless network comprising a plurality of frequency channels and a first participant, the method comprising:
   receiving data on a first subset of the plurality of frequency channels;
   receiving data on a second subset of the plurality of frequency channels;
   determining packet error rates for the plurality of frequency channels; and
   determining one of the frequency channels to be a desirable frequency channel based on the packet error rates;
   wherein the method further comprises transmitting information regarding the desirable frequency channel and a countdown value from the first participant to a second participant, wherein the countdown value indicates to the second participant when to switch to the desirable frequency channel.

2. The method according to claim 1, wherein the act of determining the one of the frequency channels to be the desirable frequency channel comprises calculating long term evaluations of the respective frequency channels; and
   wherein the one of the frequency channels is determined to be the desirable frequency channel based on the long term evaluations.

3. The method according to claim 2, wherein the long term evaluations are calculated based on a first time constant.

4. The method according to claim 2, wherein the act of determining the one of the frequency channels to be the desirable frequency channel comprises calculating short term evaluations of the respective frequency channels;
   wherein the one of the frequency channels is determined to be the desirable frequency channel based on the short term evaluations.

5. The method according to claim 4, wherein the long term evaluations are calculated based on a first time constant, and the short term evaluations are calculated based on a second time constant, the second time constant being smaller than the first time constant.

6. The method according to claim 4, wherein the one of the frequency channels is determined to be the desirable frequency channel based on a random selection from a subset of the frequency channels having identical short term evaluations and/or identical long term evaluations.

7. The method according to claim 4, further comprising determining an environment of the first participant based on the long term evaluations of the frequency channels and/or the short term evaluations of the frequency channels.

8. The method according to claim 1, further comprising maintaining the one of the frequency channels as the desirable frequency channel if the packet error rate of the one of the frequency channels is below a first threshold value or if the packet error rates of the frequency channels in the second subset is above a second threshold value.

9. The method according to claim 1, further comprising transmitting high bandwidth data between the first participant and the second participant in the second subset of the plurality of frequency channels.

10. The method according to claim 9, wherein the high bandwidth data comprises a real-time audio signal.

11. The method according to claim 1, further comprising transmitting redundant data between the first participant and the second participant in the first subset of the plurality of frequency channels.

12. The method according to claim 1, further comprising excluding a certain one of the frequency channels if the packet error rate of the certain one of the frequency channels is above a threshold value.

13. The method according to claim 1, wherein the first participant is a hearing device.

14. The method according to claim 1, wherein the one of the frequency channels is determined to be the desirable frequency channel if it has the lowest packet error rate.

15. A hearing device comprising:
    a transceiver; and
    a digital signal processor coupled to the transceiver;
    wherein the digital signal processor is configured to:
        receive data on a first subset of a plurality of frequency channels, wherein each of the plurality of frequency channels in the first subset is utilized at least once;
        receive data on a second subset of the plurality of frequency channels;
        determine packet error rates for the plurality of frequency channels; and
        determine one of the frequency channels to be a desirable frequency channel based on the packet error rates; and
    wherein the hearing device is configured to transmit a countdown value to a participant, wherein the countdown value is configured to indicate to the participant when to switch to the desirable frequency channel.

16. The hearing device according to claim 15, wherein the hearing device is configured to also transmit information regarding the desirable frequency channel to the participant.

17. The hearing device according to claim 15, wherein the hearing device is configured to maintain the one of the frequency channels as the desirable frequency channel if the packet error rate of the one of the frequency channels is below a first threshold value or if the packet error rates of the frequency channels in the second subset is above a second threshold value.

18. The hearing device according to claim 15, wherein the hearing device is configured to transmit high bandwidth data in the second subset of the plurality of frequency channels.

19. The hearing device according to claim 18, wherein the high bandwidth data comprises a real-time audio signal.

20. The hearing device according to claim 15, wherein the hearing device is configured to transmit redundant data in the first subset of the plurality of frequency channels.

21. The hearing device according to claim 15, wherein the hearing device is configured to exclude a certain one of the frequency channels if the packet error rate of the certain one of the frequency channels is above a threshold value.

22. The hearing device according to claim 15, wherein the participant is another hearing device.

* * * * *